United States Patent Office 3,427,910
Patented Feb. 18, 1969

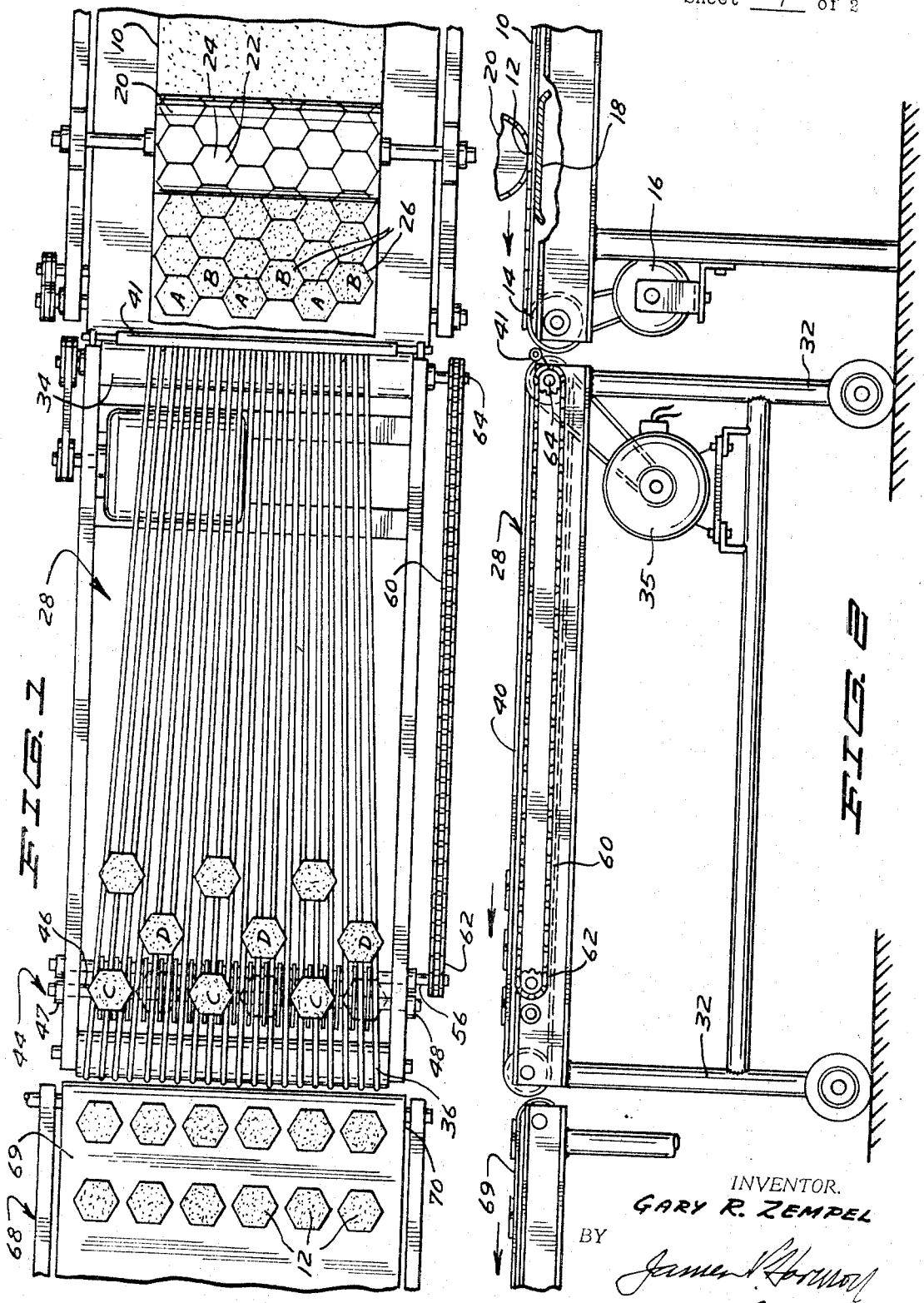

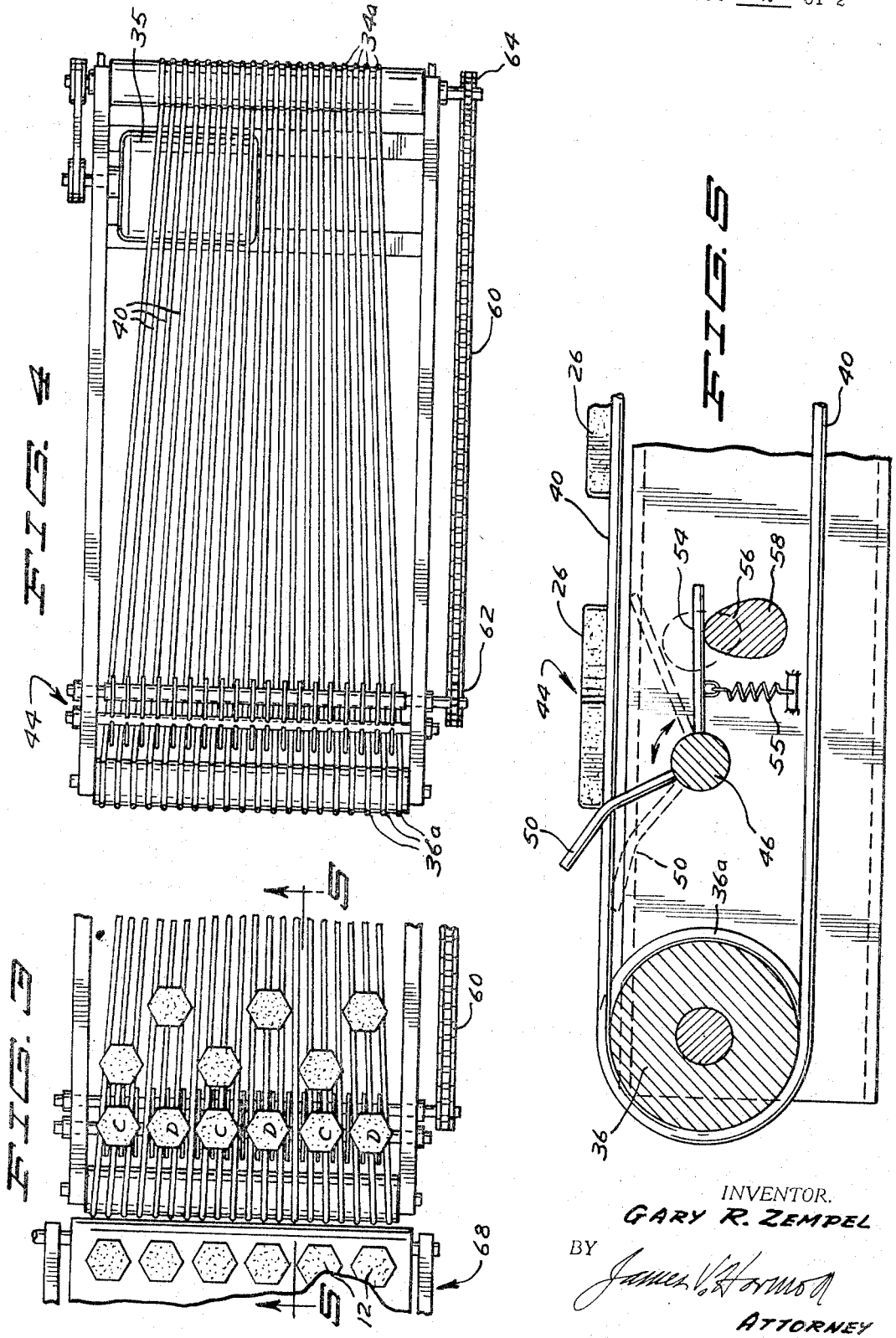

3,427,910
PASTRY TABLE PRODUCT SEPARATING
CONVEYOR
Gary R. Zempel, Minneapolis, Minn., assignor to The
Pillsbury Company, Minneapolis, Minn., a corporation
of Delaware
Filed Aug. 22, 1966, Ser. No. 573,988
U.S. Cl. 83—107                               12 Claims
Int. Cl. B65h 35/04; B26d 7/18; A21c 9/08

ABSTRACT OF THE DISCLOSURE

An apparatus for spacing pastry products such as doughnuts at the proper distance from each other in both longitudinal and laterally extending rows. Doughnuts are dropped on diverging endless belts having their downstream ends spaced further apart than the upstream ends. The conveyor transports the doughnuts towards further processing equipment and simultaneously spreads the doughnuts apart laterally. Intermittently operated arms that project up between the belts at times act as stops for engaging predetermined doughnuts at timed intervals to bring longitudinally spaced rows into lateral alignment.

---

The present invention relates to equipment employed for the handling of dough and pastry and more particularly to a conveyor for simultaneously spacing pieces of cut pastry from adjacent pieces in both the direction of travel and transverse to the direction of travel.

Prior conveyors of the general type described have had a number of significant disadvantages, the most important of which has been their large size and their complexity. Moreover, many of the pastry table conveyor devices previously proposed have been suitable for separating pieces of cut pastry in only a longitudinal or lateral direction and have not been suitable for forming both of these operations simultaneously.

While a variety of other devices have been previously proposed for separating articles, these devices in most instances cannot be adapted for use in connection with pastry owing to its relatively delicate and pliable character which greatly increases the likelihood that pieces of pastry will become torn, mutilated or be made otherwise unsuitable for further automatic processing such as proofing, baking, frying or packing.

The invention is particularly useful in the spacing of dough pieces which have been cut from a continuous sheet with the edges of the cut pieces being positioned adjacent to one another due to their having been cut with no trim between the cut pieces.

In view of these and other deficiencies in the prior art, it is one object of the present invention to provide an improved pastry handling apparatus for simultaneously spacing pieces of cut pastry both longitudinally and laterally and for placing pieces of cut pastry which were previously misaligned in lateral alignment.

A further object of the invention is the provision of an improved pastry table product separating conveyor adapted to be placed between the outlet end of a first belt conveyor and the inlet end of an adjacent belt conveyor with a single conveyor assembly for transporting the articles from the first belt conveyor to the second belt conveyor.

Another object of the invention is the provision of an improved pastry table product separating conveyor in which the pieces of cut pastry can be spaced longitudinally and laterally as well as placing previously unaligned pieces in lateral alignment.

A further object of the invention is the provision of an improved pastry table conveyor in which pieces of delicate pastry can be aligned without injury or deformation.

A still further object of the invention is the provision of an improved pastry table product separating conveyor including a plurality of laterally spaced diverging conveyor members adapted to separate the cut pieces of pastry laterally as well as providing a limited contact area support surface allowing certain of the cut pieces to be held stationary while others of the cut pieces continue to be moved by the conveyor and the limited contact between the conveyor assembly and the cut pieces allow the conveyor assembly to move without damage to the surfaces of the stationary pieces engaging the conveyor.

Briefly stated, the invention provides a pastry table separating apparatus suited for spacing and aligning bakery sweet goods and doughnuts or other products made from a sheet of dough. The device separates the cut products in two directions simultaneously as well as aligning them laterally. The apparatus consists of a transferring assembly such as a conveyor with a plurality of diverging conveyor elements preferably composed of endless bands entrained over a first roll at relatively closely spaced positions and over a second roll at relatively widely spaced locations with the direction of travel of the upper surface of the bands being from the roll upon which the bands are closely spaced toward the roll in which spacing between the ends of the bands is the greatest. A plurality of stops or hold-back arms are provided for aligning selected cut pieces. The hold-back means preferably consist of a shaft having a plurality of arms extending upwardly therefrom between the bands and adapted to engage the cut pastry while on the bands. A limited contact area between the bands and the pastry pieces will enable certain of the pastry pieces to be held stationary while the bands of the conveyor continue to move without damage to the portion of the cut pastry pieces in contact with the conveyor.

These and other more detailed and specific objects will become apparent from the following description of the invention and drawings wherein, FIGURE 1 is a plan view of one form of apparatus embodying the invention.

FIGURE 2 is a side elevational view of the apparatus of FIGURE 1.

FIGURE 3 is an enlarged partial side elevational view of the invention taken on line 3—3 of FIGURE 1.

FIGURE 4 is a plan view of a portion of the apparatus shown in FIGURE 1.

FIGURE 5 is on enlarged partial side elevational view of the invention taken along line 5—5 of FIGURE 3.

Referring now to the figures, there is shown a sheet of dough 10 which is to be formed into pastry products such as biscuits, doughnuts or the like. The dough sheet 10 is formed in any manner known to the art and is conveyed from right to left as seen in FIGURES 1 and 2 by means of an endless flexible belt conveyor 12, only a part of which is shown. The conveyor 12 is supported at the right by means of a suitable roller 14 driven by a motor 16 as seen in FIGURE 2. Positioned below the upper reach of the conveyor 12 is a supporting plate 18. Above the supporting plate 18 is a cutting roll 20 having a plurality of openings 22 therein separated by cutting blades 24 which are sharpened so that the dough 10 is cut as it passes between the roll 20 and the plate 18 into a plurality of pieces 26 which lie immediately adjacent to each other without trim between them. In this instance, the cut pieces 26 are hexagonal and can be used for making Bismarks. They can, however, be of other shapes such as square rectangular. The cut dough pieces 26 pass from the conveyor 12 to the separating conveyor 28 which will now be described.

The conveyor 28 includes a supporting framework 30 as seen in FIGURE 2 composed of a plurality of metal bars 32. Journalled for rotation at the upward end of the framework 30 are two laterally extending and longitudinally spaced parallel rolls 34 and 36. The roll 34 is driven and the roll 36 is an idler. Roll 34 is driven by means of a motor 35. Between the rolls is an endless transferring means such as a conveyor 38 composed of a plurality of endless bands 40 which in this instance are circular in cross section. The bands 40 can however be square or flat belt stock. In the present example, rubber O-rings are used. A transfer roll 41 driven from roll 34 is provided between conveyor 12 and conveyor 28. As seen in FIGURE 1, the bands 30 are mounted at relatively close intervals on the roll 34 and at relatively wide intervals on the roll 36. The upper portion of each band 40 and the conveyor surface formed thereby travels from right to left as seen in the figures. The bands thus diverge laterally from one another as they travel from the left or inlet end at roll 34 to the outlet end at roll 36. Both rolls 34 and 36 are preferably provided with circumferential grooves 34a and 36a respectively for retaining the bands 40 in place.

Positioned between the rolls 34 and 36 is a stop or hold-back assembly 44 composed of a shaft 46 mounted for movement on supports 47 and 48 for pivotal movement about a transverse axis. Extending from shaft 46 are a plurality of rearwardly and upwardly extending arms or stop members 50 which are properly aligned relative to the bands 40 to project between them when the shaft 46 is pivoted to the solid line position of FIGURE 5 thereby engaging certain of the cut dough pieces 26. Affixed to the shaft 46 is an arm 54 which extends radially therefrom and is engaged on the upper surface of a cam 56 having a lobe 58 which when it strikes the arm 54 will lower the arms 50 to the dotted line position of FIGURE 5. A resilient member such as a spring 55 is connected between arm 54 and a fixed support for biasing the arm 54 downwardly against cam 56. As can be seen in FIGURE 1, the cam 56 is driven by means of a chain 60 entrained between a sprocket 62, a sprocket 64 on the roll 34. When the arms 50 are in their elevated positions they will engage certain of the cut pieces 26 and holding them back while the conveyor 28 continues to operate.

The belts 40 should have relatively narrow smooth upper surfaces and care should be taken to see that they do not become tacky or sticky or that the upper surfaces thereof are not roughened so as to cause substantial frictional engagement with the lower surface of the cut dough pieces. While it is not essential for proper operation, it is preferred that a good quality dough releasing composition be applied to the belts periodically. Shortening, flour, silicone oil or other release agents known to the art can be employed for this purpose. It was discovered that by providing relatively narrow belts having limited contact with the cut dough pieces 26 that the stops 50 when actuated would successfully retard the forward motion of the cut pieces 26 without the bands 40 injuring them. The belt 40 can thus be thought of as a slide as well as a transferring means for the dough pieces.

From the conveyor 28, the cut pieces of dough 26 pass onto an endless flexible conveyor such as a belt conveyor 68 mounted over a pair of spaced rolls, one of which is shown at 70. The cut pieces indicated at 72 are aligned laterally with respect to one another and the rows are spaced from each other longitudinally by a predetermined distance. The rolls 70 and the conveyor 68 is powered by means of a drive motor 72.

The operation of the apparatus will now be described. To begin the operation, it will be assumed that a sheet of dough 10 is supplied from a conventional dough mixing and sheeting apparatus. The dough sheet 10 is fed onto the conveyor 12 and passes from right to left beneath the roll 20 which cuts the dough into adjacent pieces 26. The motor 35 is operated to drive the conveyor 28 at a somewhat greater speed than the conveyor 12. A speed twice that of the conveyor 12 is preferred. Accordingly, the dough pieces in a row indicated by the letter A in FIGURE 1 will be spaced longitudinally from the adjacent aligned row designated B as seen in FIGURE 1. By changing the speed of the motor 35 relative to the speed of the conveyor 12, the longitudinal spacing of the cut pieces 26 can be changed as desired. As the cut pieces travel over the conveyor 28 they will be carried apart from each other laterally due to the fanning out of the belts. As they approach the stop assembly 44 alternate rows will be held back until the next succeeding row is in exact lateral alignment with it. Thus, as seen in FIGURE 1, the row C will be held back until the row designated D is transferred to a position between those in row C and when this position is reached the rotation of cam 58 will cause the arms 52 to be lowered and all of the cut pieces which are now in lateral alignment above hold-back assembly 44 will be transferred to the end of the conveyor 28 and will pass onto the conveyor 68 which serves to carry them to a succeeding processing machine. It will be understood that the speed of rotation of the cam 58 should be in timed relationship with the speed of the conveyor 28 so that as the speed of the conveyor 28 increases, the timed intervals between the engagement of the cam 58 and the arms 54 will decrease. This can be accomplished by the chain 60 which acts as a means for timing the operation of the hold-back means relative to the speed of the conveyor 28. The arms 50 are preferably lowered as soon as the row D comes into alignment with row C. The arms 50 thus serve as a means for aligning alternate longitudinally spaced rows of cut pieces.

It should be understood that a mechanical connection between the cam 56 and the conveyor 28 is not essential. If desired, the raising and lowering of arms 50 can be accomplished by means of other timing mechanisms such as a photocell (now shown) positioned to detect the presence of the pieces D in lateral alignment with the pieces C.

A number of important advantages are achieved through the use of the invention. First, it will be noticed that a single conveyor assembly including one pair of rolls will transfer the cut pieces from the inlet to the outlet end of the apparatus, i.e. from the conveyor 12 to the conveyor 68 with both lateral and longitudinal spacing of the cut pieces being accomplished between ends of the intermediate conveyor. This not only simplifies construction and reduces manufacturing costs but makes the apparatus relatively compact and highly portable. The entire supporting framework 30 can therefore be moved as needed from one location to another and placed between the ends of any two adjacent conveyors.

It will also be seen that the bands 40 provide a threefold function. First, they act as a moving supporting surface to convey the cut dough pieces from the inlet to the outlet end of the apparatus. Second, they spread the cut pieces apart laterally. Third, they serve as slides when the hold-back arms are in the raised position.

Still another important feature of the invention is that relatively delicate objects such as freshly cut pastry pieces can be reliably handled without damage. This is particularly important since even minor imperfections often become apparent when the cut pieces are baked.

While a single hold-back assembly has been illustrated in the embodiment of the invention shown in the figures, it should be understood that a plurality of identical longitudinally spaced hold-back assemblies can be provided if desired. In this event, each of the hold-back assemblies is preferably operated in succession to briefly contact the pastry pieces and then move to the retracted position. In this way, deformation of the dough is minimized. It is also possible when a plurality of hold-back assemblies are provided to position the arms and each assembly out of alignment so that the dough pieces are contacted at a different point by each set of arms again minimizing dough deformation.

The rotary cutter has been described merely by way of example. It will be apparent that other forms of cutters such as sharpened cutting wheels, power operated guillotine cutters and the like can be employed is desired to cut the dough sheet into pieces of the desired size.

It is apparent that many modifications and variations of this invention as hereinbefore set forth may be without departing from the spirit and scope thereof. The specific embodiments described are given by way of example only and the invention is limited only by the terms of the appended claims.

I claim:

1. A pastry product separating apparatus comprising in combination a conveyor including first and second spaced rotatable members and a plurality of endless flexible belt members entrained therebetween, drive means for operating the conveyor to transfer said pastry from one end of the apparatus to the other, the ends of the belts on one of the rotatable members being spaced relatively close together and on the other relatively far apart, said belts defining a support surface with the supporting surface defined by the belts travelling toward the ends thereof spaced furthest apart, stop means mounted between the first and second rotatable member for engaging predetermined pieces of said pastry at timed intervals to bring longitudinally spaced rows of said pieces into lateral alignment and timed means for releasing the cut pieces when the alternate pairs of longitudinally spaced rows come into alignment.

2. The apparatus of claim 1 wherein the upper surfaces of the belts comprise a slide of limited area for supporting cut pieces of said product and also for letting certain predetermined cut pieces slide thereon without damage when engaged by the hold-back means.

3. The apparatus according to claim 1 wherein the belts comprise rubber rings having a circular cross section.

4. The apparatus according to claim 1 wherein said product comprises uncooked doughnut pieces.

5. The apparatus according to claim 1 wherein the stop means comprises a shaft mounted for pivotal movement about a laterally extending axis and a plurality of arms extending horizontally and adapted to project vertically when the shaft is pivoted to thereby engage the leading edge of the rows of said cut pieces.

6. The apparatus according to claim 1 wherein the belts are provided with smooth, low-friction surfaces.

7. The appartus according to claim 1 wherein the first and second rotatable members comprise rolls mounted for rotation upon laterally extending longitudinally spaced parallel axes, the first roll containing a plurality of relatively closely spaced circumferential grooves and the second roll containing a plurality of circumferential grooves on the first roll.

8. The apparatus according to claim 1 wherein said timed means comprises a mechanical driving means operatively connected between one of said rotatable members and a cam member, said cam member being operatively engaged with the stop means for pivoting the stop means to raise and lower the stop means at timed intervals.

9. The apparatus according to claim 1 wherein the apparatus includes a separating conveyor means and a cutter at the inlet end of the separating conveyor, said cutter comprising a roll having a plurality of blades on the surface thereof for cutting the sheet of dough into a plurality of adjacent pieces without trim therebetween.

10. The apparatus according to claim 9 wherein a support is positioned beneath the conveyor in vertical alignment with the cutting roll for supporting the conveyor and the sheet of dough beneath the cutting roll.

11. The apparatus according to claim 1 wherein an endless conveyor is positioned adjacent the inlet and outlet end of the apparatus to introduce dough pieces and to receive longitudinally spaced laterally aligned cut pieces of dough as they leave the end of the belts.

12. A pastry products conveying apparatus comprising in combination a conveyor including first and second spaced rotatable members and a plurality of endless flexible belt members entrained therebetween, dirve means for operating the conveyor to transfer said pastry from one end of the apparatus to the other, the ends of the belts on one of the rotatable members being spaced relatively close together and farther apart than the other of the rotatable members, said belts defining a supporting surface adapted to travel toward the end thereof spaced farthest apart when the conveyor is in operation, selectively operable stop means monuted upon the apparatus for engaging the forward leading edge portion of the pastry as it travels on the endless flexible members at timed intervals, said stop means being movable between a first position engaging the forward edge of the pastry product and a second position for releasing the pastry product whereby the longitudinal spacing between the pastry product can be changed by operating the drive means continuously and the selectively operable stop means intermittently.

References Cited

UNITED STATES PATENTS

| 2,109,812 | 3/1938 | Whitefield | 107—4 X |
| 3,161,155 | 12/1964 | Orlandi | 83—107 X |
| 3,168,056 | 2/1965 | Engels | 83—107 X |

WILLIAM S. LAWSON, *Primary Examiner*.

U.S. Cl. X.R.

83—155; 107—4